US006970798B1

(12) United States Patent
Cao et al.

(10) Patent No.: US 6,970,798 B1
(45) Date of Patent: Nov. 29, 2005

(54) METHOD, APPARATUS AND COMPUTER PROGRAM PRODUCT FOR HIGH SPEED MEMORY TESTING

(75) Inventors: Tai Anh Cao, Austin, TX (US); Khanh Nguyen, Pflugerville, TX (US); Aquilur Rahman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 10/840,559

(22) Filed: May 6, 2004

(51) Int. Cl.[7] ............................................ G06F 19/00
(52) U.S. Cl. ...................................... 702/120; 324/512
(58) Field of Search ............................ 702/120, 57–59, 702/64, 65, 79, 116, 117, 118, 182–185; 438/14, 438/16, 17; 324/500, 512, 522, 523, 532, 324/535, 764, 555; 369/53.1, 59.1, 60.1; 710/25, 107; 714/100, 1–4; 720/645

(56) References Cited

U.S. PATENT DOCUMENTS

| | | | | |
|---|---|---|---|---|
| 4,875,006 | A | 10/1989 | Henley et al. | 324/158 |
| 4,918,335 | A | 4/1990 | Chall, Jr. | 307/303.1 |
| 4,918,691 | A | 4/1990 | Chall, Jr. | 371/15.1 |
| 4,937,658 | A | 6/1990 | Chall, Jr. | 357/74 |
| 4,937,659 | A | 6/1990 | Chall, Jr. | 357/74 |
| 5,497,465 | A | 3/1996 | Chin et al. | 395/280 |
| 6,473,556 | B1 | 10/2002 | Takeuchi | 385/147 |
| 2003/0099139 | A1 * | 5/2003 | Abrosimov et al. | 365/200 |

FOREIGN PATENT DOCUMENTS

| | | | |
|---|---|---|---|
| JP | JP04-005582 | 1/1992 | G01R 31/26 |

OTHER PUBLICATIONS

G. Chiu, et al, "Optical Space Transformer for Extending VLSI Testing into the Multi-Gigahertz Range," IBM Technical Disclosure Bulletin, vol. 30, No. 10, Mar. 1988, pp. 229-233.

* cited by examiner

*Primary Examiner*—Hal Wachsman
*Assistant Examiner*—Edward Raymond
(74) *Attorney, Agent, or Firm*—Mark E. McBurney; Anthony VS England

(57) ABSTRACT

For testing a device under test ("DUT") a test specification is converted in a computer system by a pin vector generator process, which includes generating test vectors. The DUT has numerous input pins and such a pin vector is for a signal to drive one such pin. The pin vectors are compressed and saved. Ones of the pin vectors are loaded, upon initialization of a test, into a pipeline having a series of memory stages and extending from the computer system to channel cards in a test head. The pipeline is operated in data transfer cycles, delivering W bits per cycle. The pin vectors are decompressed at the respective channel cards in decompressor read cycles. X bits are read per decompressor cycle, W being greater than X, so that the pipeline may perform its data transfer cycles less frequently than the decompressor performs its read cycles.

26 Claims, 13 Drawing Sheets

| Address Sequence $A_3A_2A_1A_0$ | Data Sequence $D_3D_2D_1D_0$ |
|---|---|
| 0000 | 1111 |
| 0001 | 0000 |
| 0010 | 1111 |
| 0011 | 0000 |
| 0100 | 0000 |
| 0101 | 1111 |
| 0110 | 0000 |
| 0111 | 1111 |
| 1000 | 1111 |
| 1001 | 0000 |
| 1010 | 1111 |
| 1011 | 0000 |
| 1100 | 0000 |
| 1101 | 1111 |
| 1110 | 0000 |
| 1111 | 1111 |

710A

720A

Address Bit Vectors

| | | | | |
|---|---|---|---|---|
| $A_0$ | 0101 | 0101 | 0101 | 0101 |
| $A_1$ | 0011 | 0011 | 0011 | 0011 |
| $A_2$ | 0000 | 1111 | 0000 | 1111 |
| $A_3$ | 0000 | 0000 | 1111 | 1111 |

Data Bit Vectors

| | | | | |
|---|---|---|---|---|
| $D_0$ | 1010 | 0101 | 1010 | 0101 |
| $D_1$ | 1010 | 0101 | 1010 | 0101 |
| $D_2$ | 1010 | 0101 | 1010 | 0101 |
| $D_3$ | 1010 | 0101 | 1010 | 0101 |

Address Sequence (A3A2A1A0) / Data Sequence (D3D2D1D0) — 710B

| | Address Sequence A3A2A1A0 | Data Sequence D3D2D1D0 |
|---|---|---|
| Diagonal # 1 | 0000 | 0011 |
| | 0101 | 1100 |
| | 1010 | 0011 |
| | 1111 | 1100 |
| Diagonal # 2 | 0001 | 1100 |
| | 0110 | 0011 |
| | 1011 | 1100 |
| | 1100 | 0011 |
| Diagonal # 3 | 0010 | 0011 |
| | 0111 | 1100 |
| | 1000 | 0011 |
| | 1101 | 1100 |
| Diagonal # 4 | 0011 | 1100 |
| | 0100 | 0011 |
| | 1001 | 1100 |
| | 1110 | 0011 |

720B

Address Bit Vectors $A_0$ 0101 1010 0101 1010

$A_1$ 0011 0110 1100 1010

$A_2$ 0101 0101 0101 0101

$A_3$ 0011 0011 0011 0011

Data Bit Vectors $D_0$ 1010 0101 1010 0101

$D_1$ 1010 0101 1010 0101

$D_2$ 0101 1 010 0101 1 010

$D_3$ 0101 1 010 0101 1 010

METHOD, APPARATUS AND COMPUTER PROGRAM PRODUCT FOR HIGH SPEED MEMORY TESTING

BACKGROUND

1. Field of the Invention

The present invention concerns testing of very large scale integrated-circuitry ("VLSI") devices, and, more particularly, concerns high speed testing of such devices using test patterns.

2. Related Art

Referring now to FIG. 1, a conventional test system 100 is shown for testing very large scale integrated circuitry ("VLSI") devices, such as memory devices, application specific integrated circuits ("ASIC's"), and microprocessors. The test system 100 (also referred to herein as a "tester") includes a main frame 120, a test head 130 and a product handler 140. A computer system 110 is used as an interface between an operator and the tester 100. The interface is used to control the tester 100, to load test programs into the main frame 120, to start testing, to collect test results, etc.

Referring now to FIG. 2, details are shown of the test head 130 of the prior art test system 100. The test head 130 includes a housing platform and wiring backplanes 138 for receiving channel cards 131. Each channel card 131 is for driving a signal pin on a VLSI chip, commonly referred to as a device under test ("DUT") 136. The DUT 136 mounts in a socket/probe card assembly 134, which, in turn, mounts on a device interface board 132 for interfacing the DUT 136 to the channel cards 131. Each DUT 136 has numerous pins, including address, data, power supply and control pins. The control pins are for controlling whether data is read from or written to the device 136, among other things.

Referring now to FIG. 3A, further details of the prior art test system 100 are shown. Computer system 110 generates a test program 302 from a test specification 300. A user specifies parameters of the test specification 300 using a programmer interface 301. The programmer interface 301 is usually a custom software integrated design environment for generating device test programs 302. The testing performed by test system 100 is for guaranteeing that the device under test 136 operates properly within given operating ranges. The computer system 110 compiles the test program 302 into a binary executable program and saves it into an appropriate storage media 303, such as a hard disk. The executable test program is a compiled set of op codes that specify various test corners. A test corner includes a collection of address and data sequences at a given voltage and temperature for a set of timing constraints. The device under test 136 is tested for functionality over a range of voltages, timing constraints, process parameters and temperatures using such test programs 302.

Main frame 120 includes a test sequencer 314, an address pattern generator 316, a data pattern generator 318, an error detector 331, a data log 329, some output data buffers 328, a precision crystal oscillator 324 which is used to produce a stable, high frequency reference clock 326 for synchronization, and device power supply 327.

The test sequencer 314 controls the sequence of tests, as well as the conditions of each test, such as the particular address and data patterns, particular time set (defines test cycle times, as well as address, data, and control signal edge values within a test cycle), temperature and voltage to which the DUT 136 is subjected. The address pattern generator 316 has at least one arithmetic logic unit ("ALU") (not shown) to generate sequences of addresses necessary to access storage within the DUT 136 for read and write operations. The data pattern generator 318 has at least one ALU (not shown) to generate sequences of test data for writing to the device under test. The ALU's are programmable to generate a variety of test patterns. However, the patterns are all limited by the constraints of the ALU architecture. The ALU can generally only generate patterns of a certain type. That is, although such an ALU is programmable, the patterns that the ALU can generate still are not without substantial constraints because the ALU is designed for a certain limited set of op codes.

The error detector 331 compares the actual data read back from the DUT 136 with the expected data from the data generator 318 on a cycle-by-cycle, pin-by-pin basis to produce fail data. The data log 329 can then be used to log the fails or to ignore them. The device power supply 327 controls the power supply voltage per test corner for the DUT 136. Once the address and data patterns are generated on-the-fly, the patterns are stored temporarily in data buffers 328 and then sent to the test head 130.

Details of one of a number of channel cards 131 are illustrated in the test head 130 shown in FIG. 3A. Each channel card 131 is hardwired to represent a particular DUT 136 signal. A timing generator 342 in the test head 130 produces cycle-by-cycle timing data for each DUT 136 signal. The timing data includes such parameters as the coarse and fine delays and pulse width per test cycle. The timing generator 342 also produces state information such as whether a particular signal has to be in a "0" state or a "1" state outside the signal's active portion within a test cycle. For proper results the address pattern generator 316, data pattern generator 318 and timing generator 342 all have to operate in synchronism. Accordingly, crystal oscillator 324 in the main frame 120 generates master clock 326 in order to provide a reference frequency that is also transmitted to test head 130 on bus 325 for synchronizing the address pattern generator 316, data pattern generator 318 and timing generator 342.

The signal formatter 343 merges the raw digital patterns of the data/address ALU for a signal with the signal's corresponding timing data to produce a signal with precise edges in relationship to the beginning of each test cycle. The signal is then driven to the DUT 136 by pin driver 348 with the correct up and down voltage levels.

Parametric measurement unit ("PMU") 349 forces or measures voltage or current on the DUT 136 pin. Comparator 344 compares analog data of the DUT 136 and a reference voltage to produce digital "1's" and "0's" for the error detector 331 in the main frame 120.

Referring now to FIG. 3B, additional aspects of the system 100 of FIG. 3A are shown. The computer 110, test sequencer 314, data generator 318 and address generator 316 process data for the DUT 136 on the full widths of address and data fields. However, the timing generator 342, signal formatter 343, comparator 344, pin driver 348, error detector 331 and data log 329 in each respective channel card 131 process data for the DUT 136 on a cycle-by-cycle, pin-by-pin basis. Thus, each channel card 131 is hard wired to the address generator 316 and data generator 318 by a single, dedicated conductor. This arrangement results in an large number of cables carrying data at high speed from the main frame 120 to the channel cards 131.

In recent years there has been a trend to migrate functions from the main frame 120 to the channel cards 131, even to the extent of locating ALU's in the channel cards 131. At an extreme, each channel card 131 becomes an "instrument" in itself that includes multiple cards. Moving main frame 120 functionality to the channel cards 131 tends to reduce some data path problems by moving some high speed operations of the system 100 closer to the DUT 136. However, there is still a problem of synchronizing all the cards 131, which may number even in the hundreds. This is a considerable problem at high speed. Moreover, the problem of flexibility in pattern generation still exists.

In summary, prior art systems use high speed, localized, complex hardware-ALU's for address and data pattern generation operating at test speeds and use a long and high speed electrical tester bus. Both of these conventional features limit tester functionality at high speed because with this arrangement write and read operations of the tester are highly critical all the way from the main frame to the DUT and back. Also, as mentioned before, the hardware ALU's, due to their architectural limitations, can only generate certain types of test patterns. Therefore a need exists for improvements in high speed testing.

SUMMARY OF THE INVENTION

The foregoing need is addressed in the present invention. A process of the present invention (referred to herein as a pin vector generator or a bit vector generator) strips out patterns for each individual DUT signal pin (address pin, data pin, etc.) from conventional full-width test vectors. These full-width test vectors are from test patterns produced by a conventional test program. (They are referred to as full-width test vectors because they have widths equal to the whole address and data field width of the DUT.) The slicing of the conventional full-width test vectors by the pin generator produces a pin vector for each one of the DUT pins. The pin vectors are compressed and packaged to produce packets of data which are saved in a suitable storage media before test. Each packet also includes the address of its target channel card as well as one or more pointers to relevant timing and voltage data, such data being referred to herein as DUT vectors. This preprocessing of test vectors avoid the necessity of high-speed, on-the-fly, test pattern generation via hardware ALUs during test. This also removes limitations on the types of test patterns that can be generated.

At test initialization, the test packets and DUT vectors are loaded into a "pipeline" having a series of memory stages, i.e., data buffers in the tester, extending from the computer system all the way to the channel cards in the test head. The DUT vectors are preloaded into register files residing in each channel card during test initialization. As a test sequence progresses, fresh packets are constantly loaded to keep the memory pipeline filled. Each channel card may receive all of its data packets in a sequence corresponding to the sequence of specified tests. Alternatively, each packet may include a sequence identifier so that the packets can be sent out of order but processed by the channel cards for specified test sequences.

At the channel cards, each compressed pin vector is decompressed by a hardware assist decompressor and then processed through a parallel-in serial-out, high speed buffer. Each decompressed bit is then conditioned by a formatter before a pin driver delivers a precision signal to the channel card's respective DUT pin at high test speed.

Because of the parallel-in, serial-out buffer mechanism, the decompressor output can be at a lower speed than the test speed at which the DUT pins are driven. For each of its output operating cycles the decompressor outputs to the parallel-in, serial-out buffer a relatively wide stream of bits. The formatter receives bits from the buffer at the test frequency, which is higher than the output operating frequency of the decompressor since the formatter receives from the parallel-in, serial-out buffer a one-bit wide stream of bits. Similarly, since the compressed pin s are delivered to the decompressor through the memory pipeline the speed of the pipeline is even lower than the decompressor speed. Furthermore, since the pin vectors are delivered to the decompressor as compressed pin vectors the speed of the pipeline is even lower than the decompressor speed, i.e., each input cycle the decompressor takes in X bits, and each output cycle the decompressor outputs Y bits, where Y>X and the input frequency is correspondingly less than the output frequency. Furthermore, the compressed pin vectors are delivered for each output operating cycle of the pipeline in bit sets having more bits than that which the compressor reads in each of its input operating cycles. That is, the pipeline is wider than the decompressor input, and, therefore, the output operating frequency of the pipeline may be even lower than the output operating frequency of the decompressor. All of these arrangements contribute to enable the pipeline to operate slower than the decompressor. Consequently, the DUT runs at very high speed while the pin vectors are concurrently delivered to the test head at a substantially lower speed.

Instead of a conventional high speed electrical tester bus, the tester of the present invention has an optical control bus that is relatively narrow and very fast and a data bus that is electrical but slower and wider. The packets are transmitted from the computer over the electrical bus to the test head. In various implementations the width of the tester data bus may be a function of the desired volume of data transmission and the desired efficiency of the compressor. For example, in one implementation the data bus is 256 bits wide. This is in contrast to the prior art arrangement in which data and address generators are hard wired by dedicated, single data conductors to respective channel cards. The arrangement of the present invention is advantageous because each packet sent from the computer system to the test head during test utilizes the full width of the tester electrical data bus. That is, bits of a packet are transmitted in parallel on numerous bits of the data bus. In one implementation bits of a packet are transmitted in parallel on the entire bit width of the data bus. Since the electrical bus (also referred to herein as the "data bus") is relatively wide and the pin vectors are compressed, a large number of pin vectors are transmitted in packets quickly at a relatively low data transmission frequency.

A few high speed optical control signals are transmitted on the optical bus and converted by a converter into electrical signals. The electrical signals are then divided by dividers to produce secondary electrical clocks clk0, clk1 . . . clkx at each of the channel cards. This mechanism advantageously produces all the necessary high speed electrical signals only very close to the DUT. Also, a high frequency reference clock is delivered in the optical domain in this manner, which provides critical high speed synchronism and control of timing signals needed for high speed testing. This avoids the necessity of the difficult task of delivering high speed electrical signals from the main frame to the channel cards in the test head. Using the optical signal to synchronize the channel cards also reduces constraints commonly associated with high speed synchronization in the electrical domain over a long transmission line and with large loads such as a large number of channel cards.

To restate the above, the tester of the present invention advantageously utilizes distributed operations (distributed both in software and in hardware domains) to replace functions of conventional ALU's and utilizes a wider but slower electrical data bus and a narrow but much faster optical control bus. The buses of the present invention traverse only a very short path between the parallel-in serial-out high speed buffer in the test head and the DUT for critical high speed operations. Thus, according to the invention, preprocessed pin vectors are transmitted over the data bus at a frequency that is substantially lower than the testing frequency of the DUT. (This is in contrast to the conventional practice of using hardware ALU's to generate address and data patterns at test speed on-the-fly and transmitting the patterns at high speed.) This, in turn, enables the present system to be used to test devices that operate at higher frequencies than would otherwise be possible and enables the use of a software program written in a high-level language, such as Perl, Java, etc., running on a conventional computer to generate the pin vectors, instead using of special, dedicated and localized high-speed hardware ALU's. This also permits flexibility regarding the patterns that can be generated for the pin vectors.

Thus, for the tester of the present invention complexity is buried in the software portion of the distributed ALU-like functionality, including a pre-processor software portion for generating test patterns and a post-processor software portion for analyzing collected DUT data. The pre-processor has a programmer interface, a test program generator, and the previously mentioned pin vector generator and compressor. The post-processor has a decompressor, error detector/data log, and a database. The hardware portion of the distributed ALU-like functionality is much simpler, with respect to its computational logic complexity, than the prior art hardware ALU's, and includes a hardware assist decompressor for delivering the pin vectors to the DUT and a hardware assist compressor to collect the DUT data for storage and post-processing.

In an alternative embodiment an optical bus is provided for data transmission instead of the previously mentioned electrical data bus. This increases the maximum achievable testing frequency and can also support testing of devices with higher signal pin counts, i.e., devices needing more channel cards.

Additional objects, advantages, aspects and forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 4A:
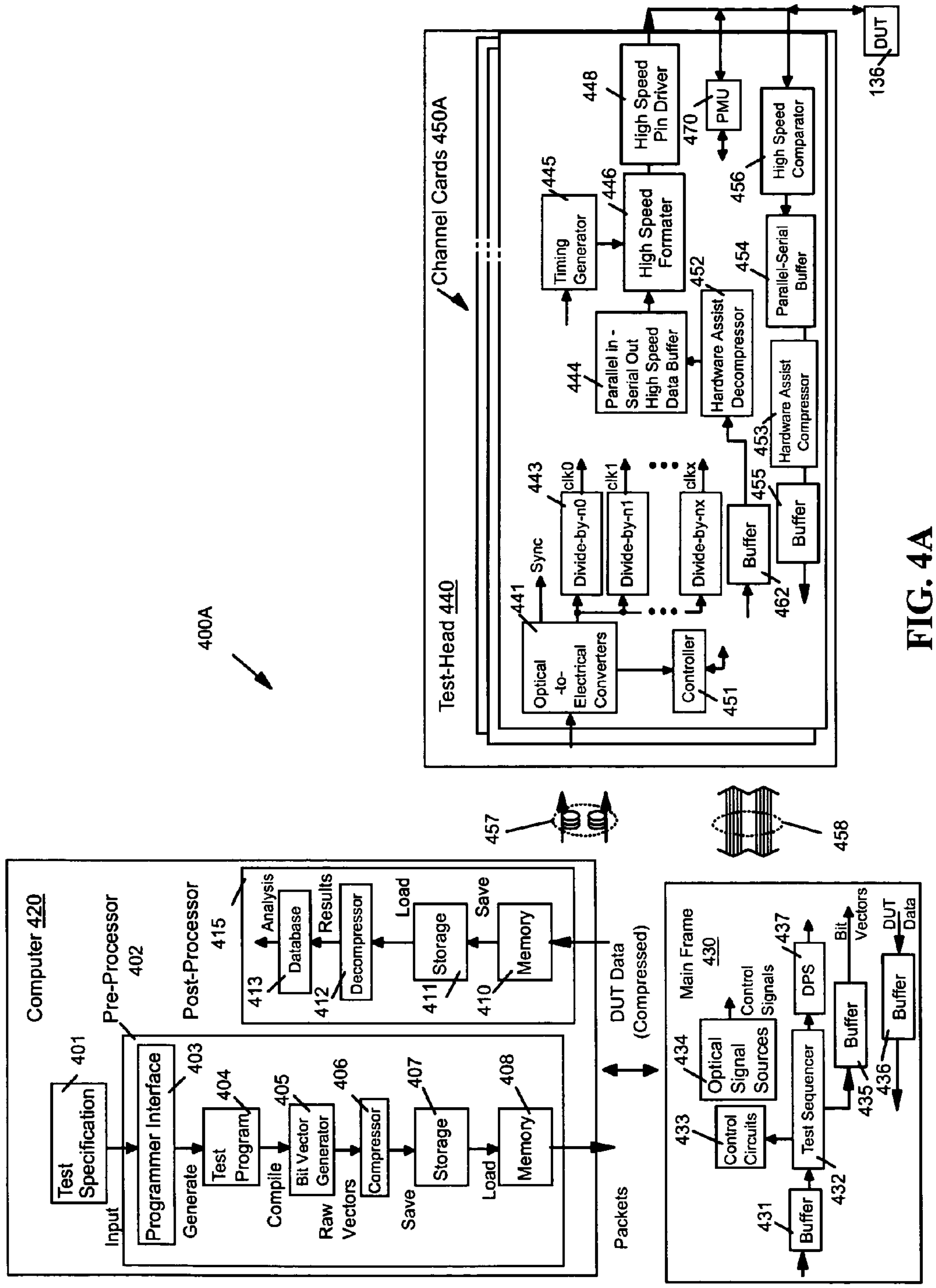
FIG. 4A illustrates a test system, according to an embodiment of the present invention.

Referring now to FIG. 4A, test system 400A is illustrated in block diagram form, according to an embodiment of the present invention. For the illustrated embodiment of the present invention, test packets are produced in computer system 420 by software processes before testing begins. In other words, test packets are "preprocessed" by software block 402. More specifically, test program 404, which receives test specification 401 via programmer interface 403, is converted by a bit vector generator 405 (also referred to herein as a pin vector generator) that has specialized ALU software in a conventional computer system 420. This generates pin vectors that define signals asserted on respective data and address pins of the DUT 136 for a sequence of test cycles.

The preprocessing also produces DUT vectors that specify timing and voltage for the tests. That is, a DUT vector specifies at what voltage level a signal on a pin is asserted and when the signal starts and ends relative to a particular cycle. One such DUT vector may apply to all the pins on the DUT 136 and may even apply to numerous tests. Alternatively, one DUT vector may apply to all address pins and another DUT vector may apply to all data pins. Generally a DUT vector applies more nearly to the whole DUT 136 and each pin vector applies to an individual pin of the DUT 136. There may be exceptions, however, in which a single pin vector may apply to a number of pins. This exception usually arises because for a particular sequence of test patterns specified by a pin vector there may be a number of pins for which the same sequence of signals is asserted. Likewise, one DUT vector may sometimes apply only to selected pins.

After the pin vectors are produced they are compressed by compressor 406. Then each pin vector is packaged into packets with one or more pointers to one or more DUT vectors and the test packets and DUT vectors are stored in storage 407. This may be done before testing begins. That is, a set of the DUT vectors and the packets containing the compressed pin vectors may be saved in storage 407 before testing of the DUT 136 begins, the set being for a "complete" test of the DUT 136 so that the set does not have to be added to by the generator 405 during the test of the DUT. Consequently, in this circumstance there are no high speed, on-the-fly test pattern generations during test.

A "complete" test includes, for example, a test that writes to all the memory cells of the DUT 136 and reads the contents of the cells back out again. A complete test may even include the performance of this cycle numerous times, in which different patterns of data are written each time. A complete test may also include performance of cycles that vary the voltage or timing of the data written to the DUT 136 pins.

The system 420 may be a conventional computer system, although the test packets are specially adapted for the features of the invention and are produced by software that is likewise specially adapted. Producing the test packets via software in a conventional computer system as described above eliminates limitations that hardware ALU's have regarding the types of patterns they can generate.

At test initialization, the test packets and DUT vectors are loaded into a "pipeline" having a series of memory stages, i.e., data buffers 408, 431, 435, and 462, in the tester 400A, extending from the computer system 420 all the way to the channel cards 450A in the test head 440. As the test progresses, fresh test packets and possibly additional DUT vectors are constantly loaded to keep the memory pipeline filled. The "pipeline" includes bus 458 for transmitting test packets from the computer 420 to respective buffers 462 in each channel card 450A. Data bus 458 of tester 400A (FIG. 4A) is electrical, but wider than a conventional high speed electrical tester bus. For reasons described herein below, the bus 458 may be slower than the data bus of a conventional tester.

Tester 400A also has an optical control bus 457 that is relatively narrow and very fast. Timing for data transfer and other operations is controlled by signals from the master and timing clocks in signal sources 434, which are delivered over optical links 457 to optical-electrical converters 441 in each channel card 450A. (The speed of operation of the tester 400A of the present invention, as governed by the master clock, is limited by technology of optical-electrical converters. An operating frequency of up to 12 GHz is within the capability of currently available optical-electrical converters, which is sufficient for the present invention.) The electrical signals from converters 441 are then divided by dividers 443 to produce secondary electrical clocks clk0, clk1 . . . clkx at each of the channel cards 450A. This mechanism advantageously produces all the necessary high speed electrical signals only very close to the DUT 136. Also, a high frequency reference clock is delivered in the optical domain in this manner, which provides the critical high speed synchronism and control of timing signals needed for high speed testing.

Returning now to the description of data transfer, the data buffers 462 in each channel card 450A are capable of receiving data in parallel from the wide bus 458 and delivering parallel data on demand to the decompressor 452. For ease of future tester enhancement the decompressor 452 is a firmware upgradeable and hardware plugable unit.

The uncompressed pin vectors are then fed into the parallel-in serial-out high speed data buffer 444. The buffer 444 concurrently streams out serially the received parallel data to the high speed formatter 446, timed by one or more of the divided master clocks 443 at test speed, which is very high. The pin driver 448 delivers a precision signal to the DUT 136 at test speed.

In one embodiment of the invention, the parallel-in serial-out buffer 444, the formatter 446, and the pin driver 448 are electrically very close to one another, such as mounted on the same printed circuit card or multi-chip module, or even on the same integrated circuit chip. Consequently, these units are capable of a very high speed serial data transmission rate that is sufficient to keep up with the rate of data transfer required for high speed testing of the DUT.

Figure 1:
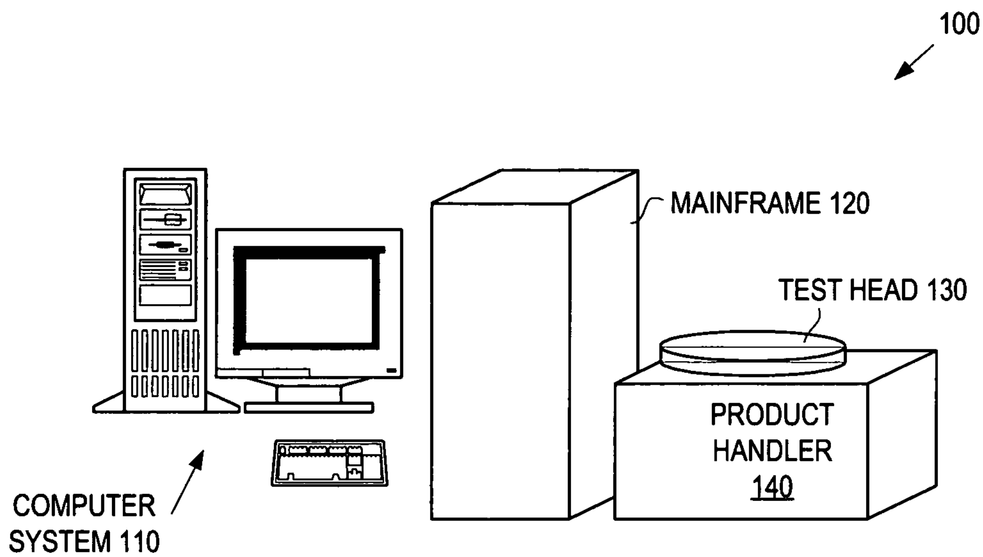
FIG. 1 illustrates a high level view of a test system, according to the prior art.
Figure 2:
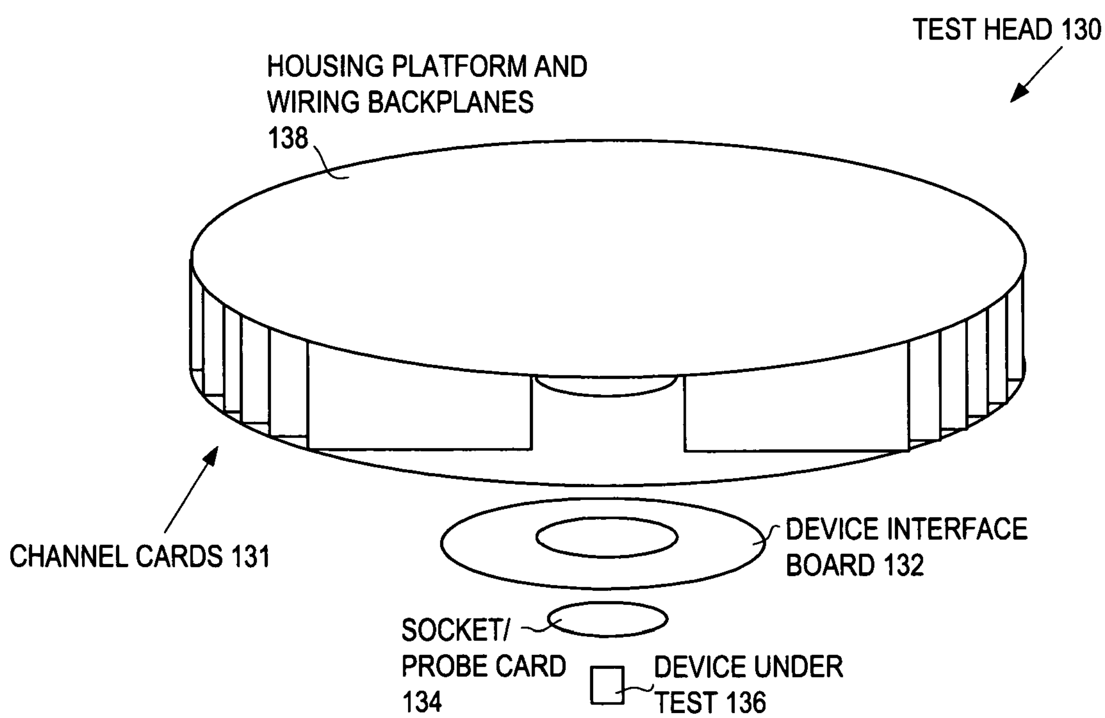
FIG. 2 illustrates details of a test head of the test system of FIG. 1.
Figure 3A:
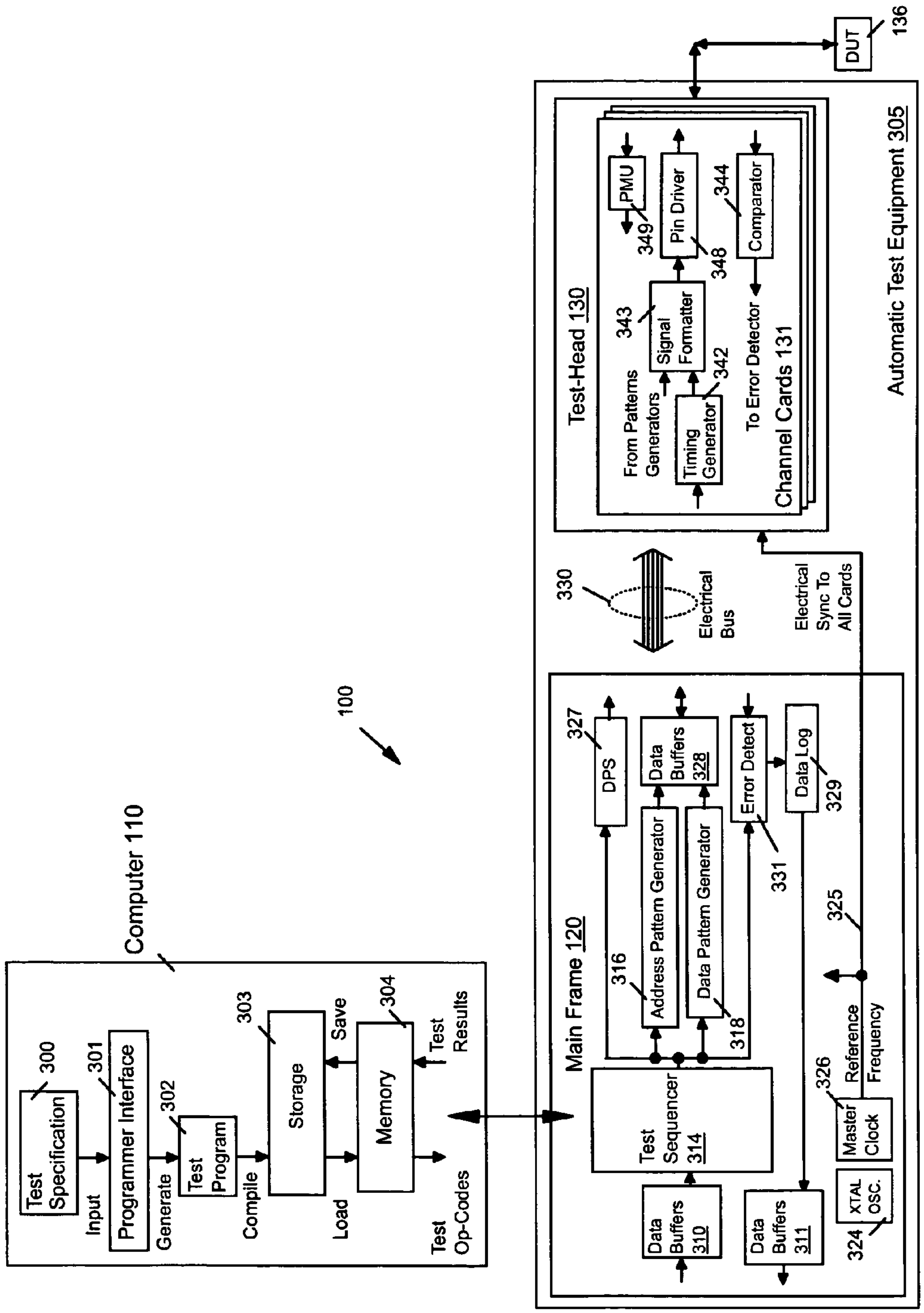
FIG. 3A illustrates more details of the system of FIG. 1.

The test sequencer 432, the DPS 437, the timing generator 445, the formatter 446, the pin driver 448, the PMU 470, and the comparator 456 for each channel card 450A function in substantially the same manner as the corresponding blocks in the prior art system 100 of FIG. 3, except in some respects, certain ones of which are described herein. The error detector 331 and the data log 329 of the prior art test system 100 (see FIG. 3A) are eliminated from the main frame 430 of the present invention. Their role is handled by the database 413 of the post-processor 415.

The raw (analog) DUT 136 data that is collected by the testing is fed into the comparator 456 which converts the serial DUT 136 data into digital 1s and 0s. This serial digital DUT data is then fed into the compressor 453 via buffer 454 in parallel to be compressed. For ease of future tester enhancement the compressor 453 is a firmware upgradeable and hardware plugable unit.

Compressed data is then buffered 455 and then transmitted over the electrical bus 458 all the way to the computer 420 and saved in storage 411. The software post-processor 415 then uses the decompressor 412 process to extract the DUT 136 data and the test results are analyzed by a suitable error detector/data log process and then saved in a database 413.

Thus, according to the above described arrangement, preprocessed test packets are transmitted over the data bus 458 at a frequency that is substantially lower than the testing frequency of the DUT 136. This is in contrast to the conventional practice of using hardware ALU's to generate address and data patterns at test speed on-the-fly and transmitting the patterns at high speed. This, in turn, enables the system 400A to be used to test devices that operate at higher frequencies than would otherwise be possible and enables the use of a software program written in a high-level language, such as Perl, Java, etc., running on a conventional computer to generate the test packets, instead using of special, dedicated and localized high-speed hardware ALU's. This also permits flexibility regarding the patterns that can be generated for the test packets.

Figure 4B:
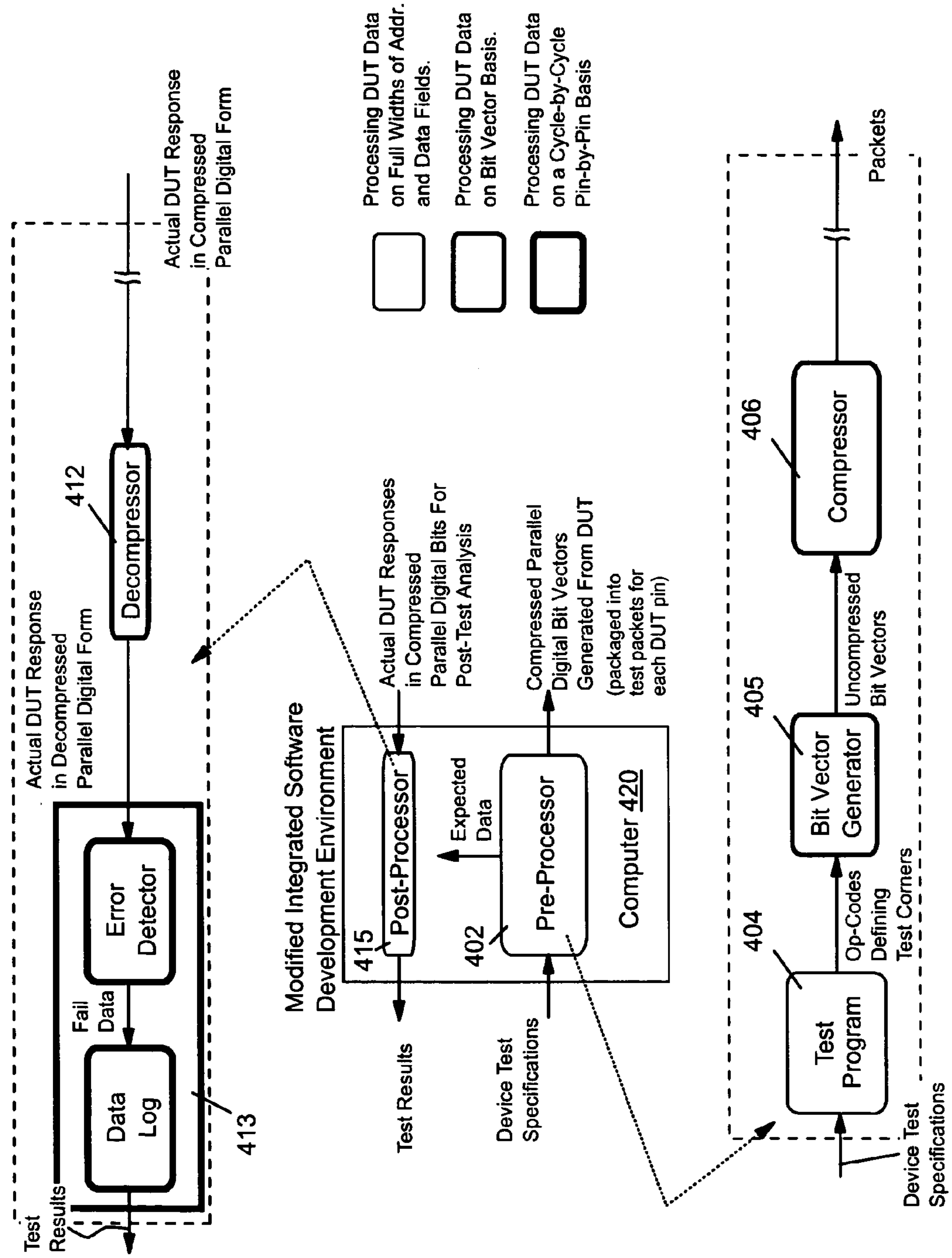
FIGS. 4B and 4C illustrate interrelationships between major units shown in FIG. 4A, according to an embodiment of the present invention.
Figure 4C:
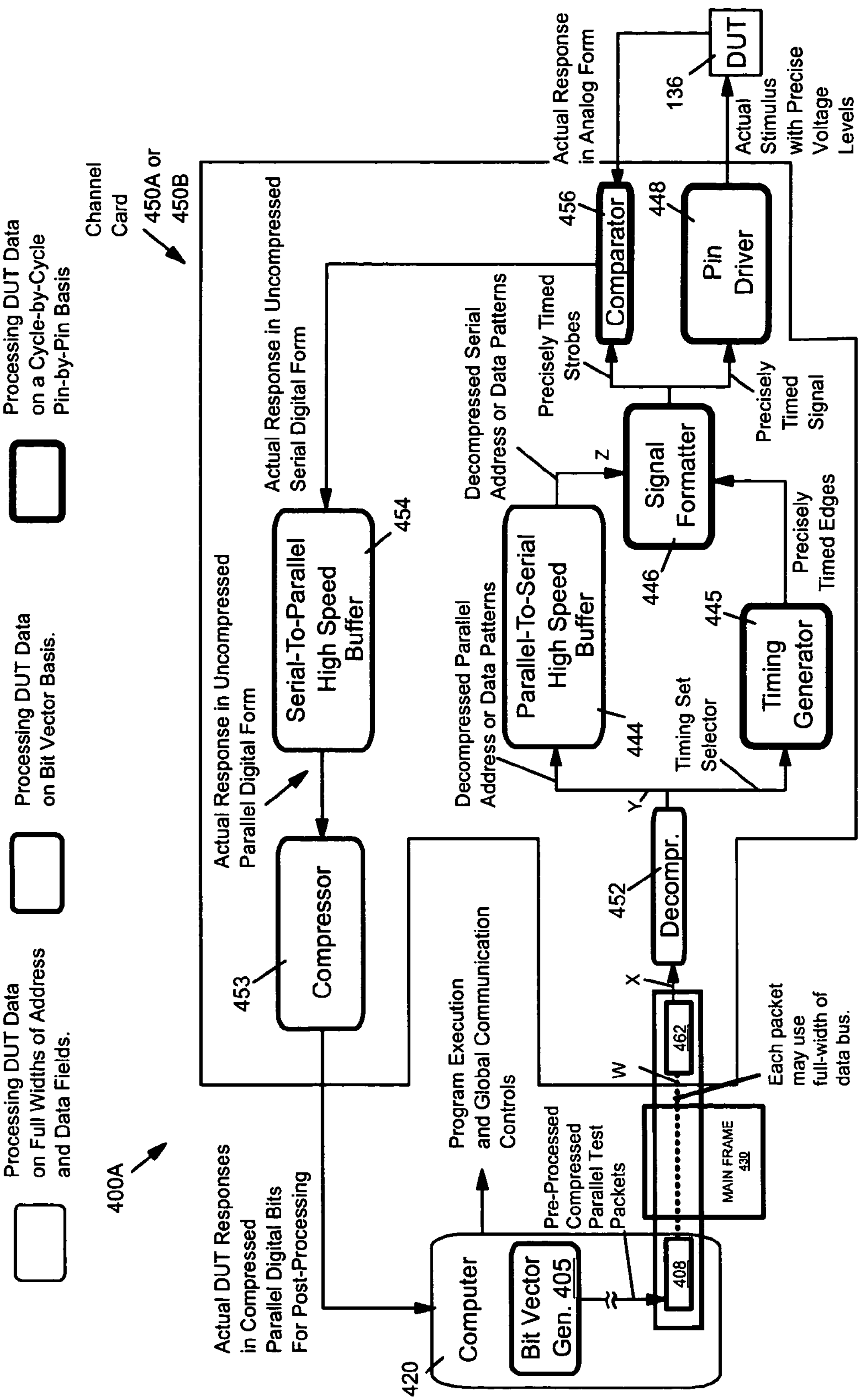
Figure 4D:
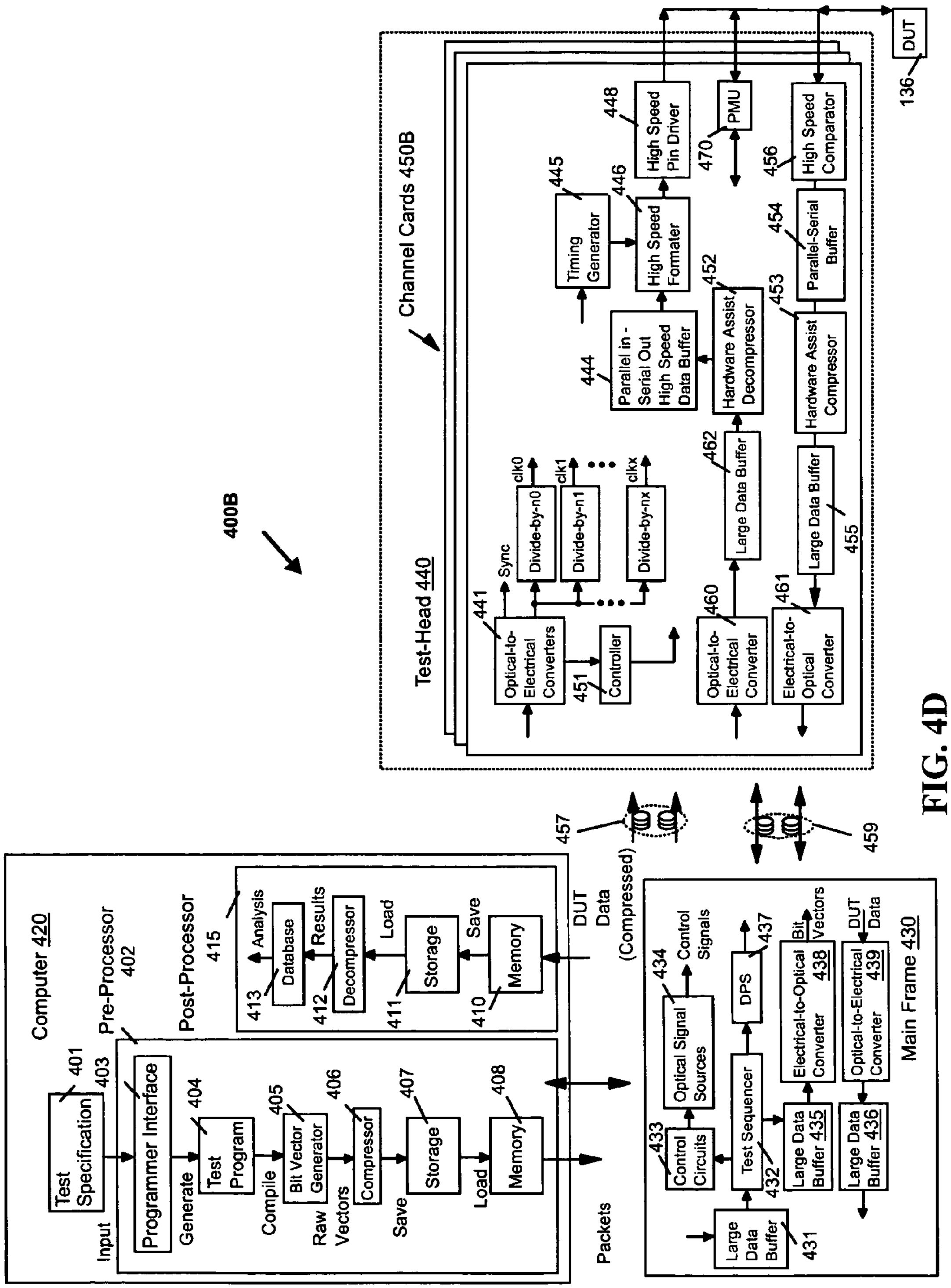
FIG. 4D illustrates an alternative embodiment of the test system of FIG. 4A, according to an embodiment of the present invention.

Referring to FIG. 4D an alternative embodiment is illustrated. In this embodiment electrical data bus 458 of FIG. 4A is converted to an optical bus 459 so that the data bus transmission is by optical means also. Correspondingly, converters 460 and 461 and associated data buffers 462 and 455 are included in channel cards 450B and converters 438 and 439 are included in the main frame 430. (It should be understood that in both system 400A and 400B the electo-optical converters can be implemented in a variety of ways, as is known in the art.) This pushes the testing frequency further up and can also support testing devices with higher signal pin counts (i.e., needing more channel cards). By use of the optical data bus 459 and data compression, data may potentially be transmitted to the test head 440 at an even higher rate than the test frequency.

Figure 3B:
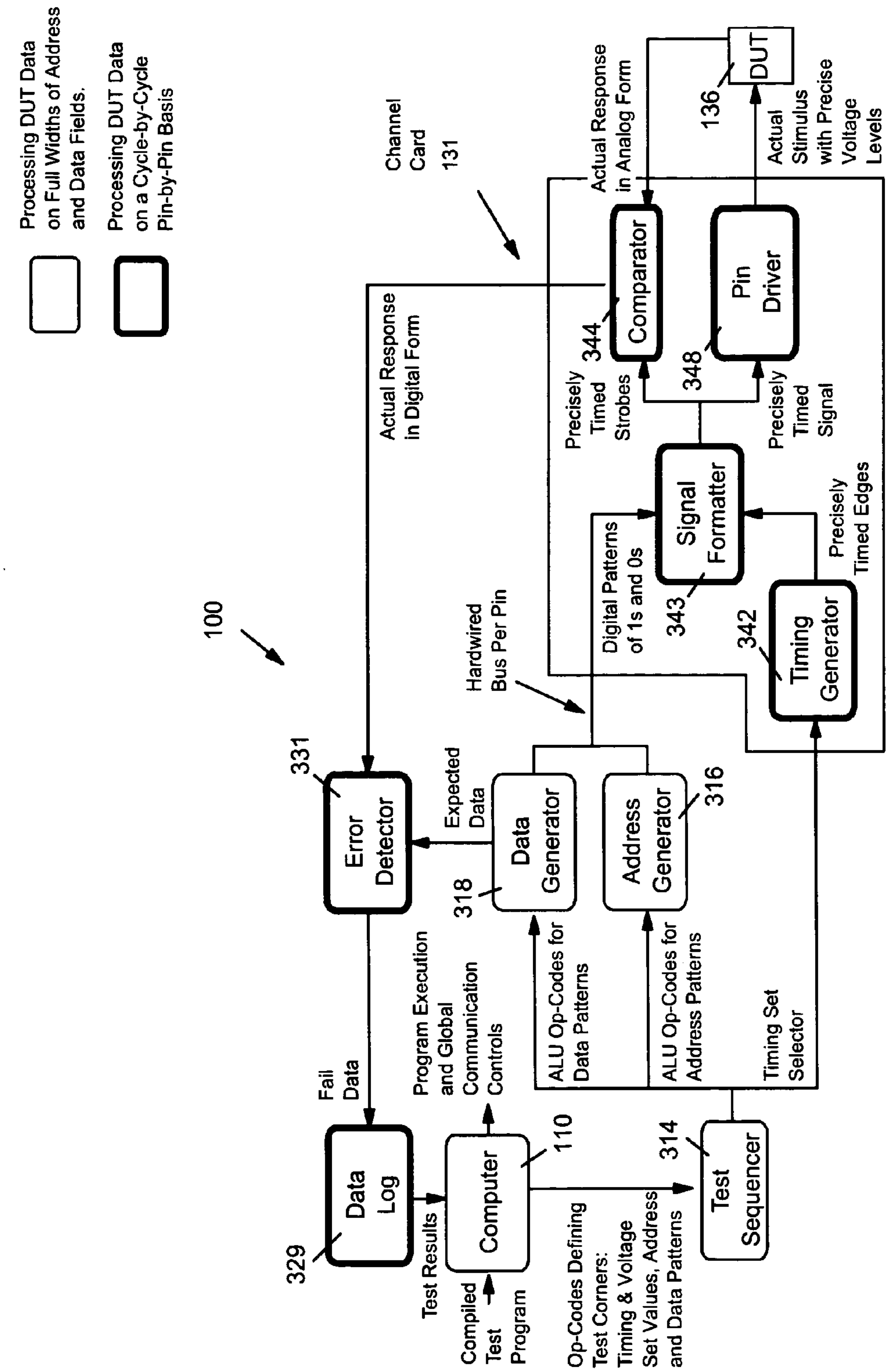
FIG. 3B illustrates interrelationships between major units shown in FIG. 3A.

Referring now to FIG. 4B, certain additional aspects are illustrated of the pre-processor 415 and post-processor 402 programs running in computer 420. FIG. 4B particularly distinguishes the pre-processor 415 and post-processor 402 programs running in computer 420 as compared to the programs in the computer system 110 of the conventional test system 100 shown in FIG. 3B. In the computer system 110 of system 100, the programs process data for the DUT 130 on the basis of the full widths of the address and data fields. In contrast, while the test program 404 running in computer 420 processes data for the DUT 130 on the basis of the full widths of the address and data fields, the pin vector generator 405 and compressor 406 of the pre-processor 402, and the decompressor 412 of the post-processor 415 process data for or from the DUT 136 on a pin, i.e., bit, vector basis. Also, the database 413 running in post-processor 415 processes data from the DUT 136 on a cycle-by-cycle, pin-by-pin basis, which is done in the main frame 120 of system 100 shown in FIG. 3B.

Referring now to FIG. 4C, certain additional aspects are illustrated of the system 400 of FIG. 4A to distinguish the system 400 from the conventional test system 100 shown in FIG. 3B. As previously stated, in system 100 of FIG. 3B the timing generator 342, signal formatter 343, comparator 344, pin driver 348, error detector 331 and data log 329 process data for the DUT 136 on a cycle-by-cycle, pin-by-pin basis. While the data processing by timing generator 445, signal formatter 446, comparator 456 and pin driver 448 of system 400 differs from that of the timing generator 342, signal formatter 343, comparator 344 and pin driver 348 of system 100; nevertheless, the timing generator 445, signal formatter 446, comparator 456 and pin driver 448 of system 400 processes DUT 136 data on a cycle-by-cycle, pin-by-pin basis, as do the corresponding elements of system 100. However, unlike the system 100 of FIG. 3B, the system 400 of FIG. 4B processes data sent to DUT 136 on a pin vector basis in certain elements, namely from the pin vector generator 405 through the buffer 431, test sequencer 432 and buffer 435 of main frame 430 (FIG. 4A), buffer 462, decompressor 452 and parallel-to serial high speed buffer 444 of the channel cards 450A or 450B. Also, the system 400 of FIG. 4C processes data collected from DUT 136 on a pin vector basis through the serial-to parallel high speed buffer 454 and compressor 453 of the channel cards 450A or 450B.

Of particular note, because of a variety of mechanisms illustrated in FIG. 4C test packets are sent by computer 420 at a substantially lower frequency than the operating frequency of the pin driver 448 in a typical channel card 450A or 450B. According to one such mechanism, decompressor 452 output Y can be at a much lower speed than the test speed at which the DUT 136 pins are driven by pin driver 448 due to parallel-in, serial-out buffer 444. That is, for each of its output operating cycles the decompressor 452 outputs to the parallel-in, serial-out buffer 444 a relatively wide stream Y of bits. The formatter 446 receives bits from the buffer 444 at the test frequency, which is much higher than the output operating frequency of the decompressor 452 since the formatter 446 receives from the parallel-in, serial-out buffer 444 a one-bit wide stream Z of bits.

Also, test packets are delivered to the decompressor 452 through a memory pipeline from buffer 408 through buffer 462, which has a bit width W into buffer 462. Since the test packets are delivered to the decompressor 452 as compressed test packets the speed of the pipeline may be lower than the decompressor 452 speed. That is, each input cycle the decompressor 452 takes in X bits, and each output cycle the decompressor 452 outputs Y bits, where Y is greater than X, and the decompressor 452 input frequency is correspondingly less than its output frequency.

Still further, the compressed test packets are delivered for each output operating cycle of the pipeline in bit sets having a bit width W that is wider than the number of bits that the compressor 452 reads in each of its input operating cycles. Therefore, the output operating frequency of the pipeline, i.e., the frequency with which it delivers bit sets to buffer 462, may be still lower than the output operating frequency of the decompressor 452.

All of these mechanisms contribute to enable the DUT 136 to run at very high speed while the test packets are concurrently delivered to the channel card 450A or 450B at a substantially lower speed.

Figure 5A:
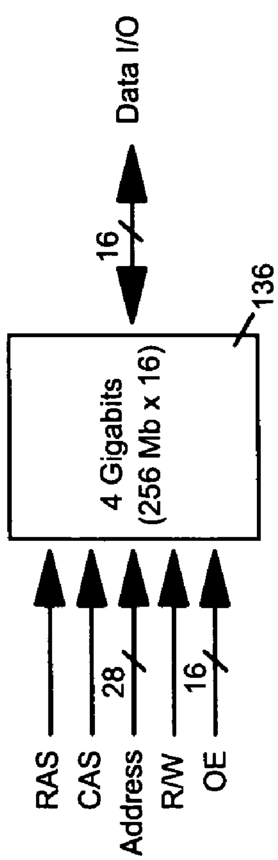
FIG. 5A illustrates an example device under test, according to an embodiment of the present invention.
Figure 5B:
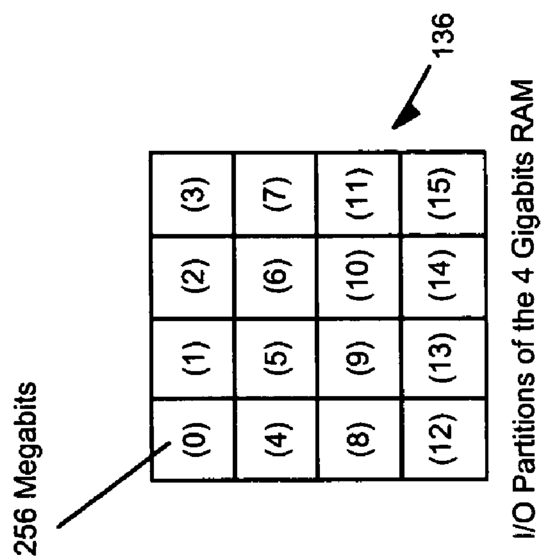
FIG. 5B illustrates partitioning of the device of FIG. 5A.

Referring now to FIGS. 5A and 5B, an example device under test is shown for the purpose of illustrating test data transfer requirements. The illustrative DUT 136 is a nominal four gigabit random access memory ("RAM") device. The RAM device 136 is partitioned into sixteen portions as shown in FIG. 5B. Accordingly, each portion has nominally 256 megabits of memory (actually 268,435,456 bits). Referring again to FIG. 5A, it may be seen that the RAM has pins for receiving respective signals as shown, including pins for a row address strobe ("RAS"), a column address strobe ("CAS"), a 28-bit address signal, a read/write mode ("R/W") signal and a 16-bit output enable ("OE") signal. The RAM also has sixteen input/output pins for reading or writing data to the device. Thus, the RAM device as shown has sixty-three pins. (The test system 400A of FIG. 4A accordingly has at least sixty-three channel cards 450A if set up for testing the device 136 of FIG. 5A, one card 450A for each of the pins in the device 136.)

Figure 6A:
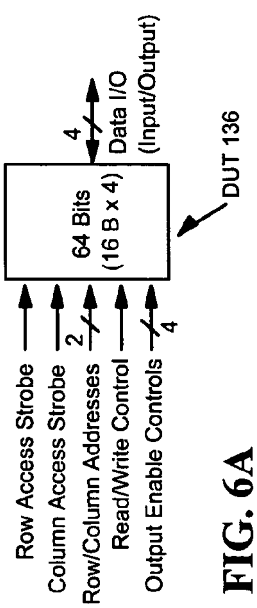
FIG. 6A illustrates a simplified memory device, according to an embodiment of the present invention.

Referring now to FIG. 6A, a simplified, 64-bit memory device 136 is shown, to illustrate an embodiment of the present invention. The simplified device 136 has 16 cells in each of four partitions for holding data bits, and has strobe, address, control and data lines, as shown, for reading and writing to the cells.

Figure 6B:
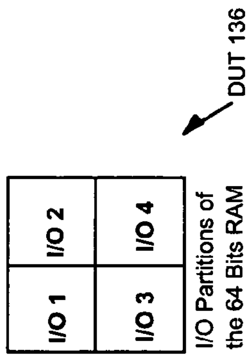
FIG. 6B illustrates partitioning of the simplified memory device of FIG. 6A.

FIG. 6B illustrates the four partitions of the simplified memory device 136 of FIG. 6A, I/O 1, I/O 2, etc.

Figure 6C:
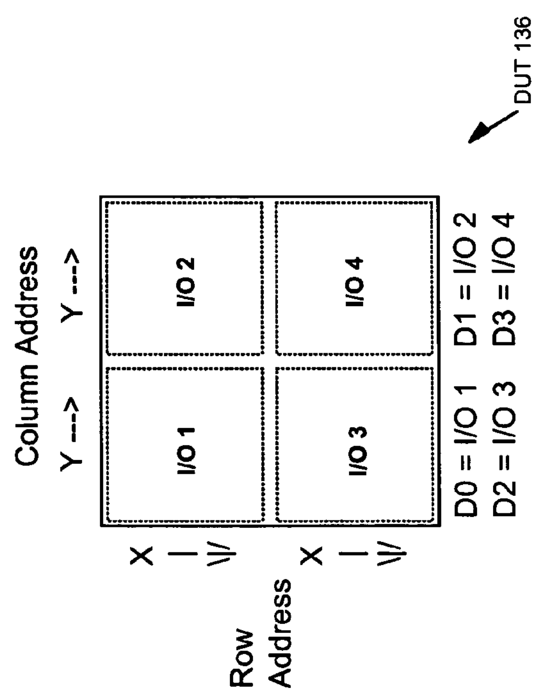
FIG. 6C illustrates additional partitioning details of the memory device of FIG. 6A.

FIG. 6C illustrates additional details about how the cells of each partition of the simplified memory device 136 of FIG. 6A are accessed. That is, the cells (not shown) of each partition are accessible by asserting addresses having a portion representing a row address X and a portion representing a column address Y. A bit for a cell of the I/O 1 partition is asserted on data pin D0, a bit for a cell of the I/O 2 partition is asserted on data pin D1, etc.

Figure 6D:
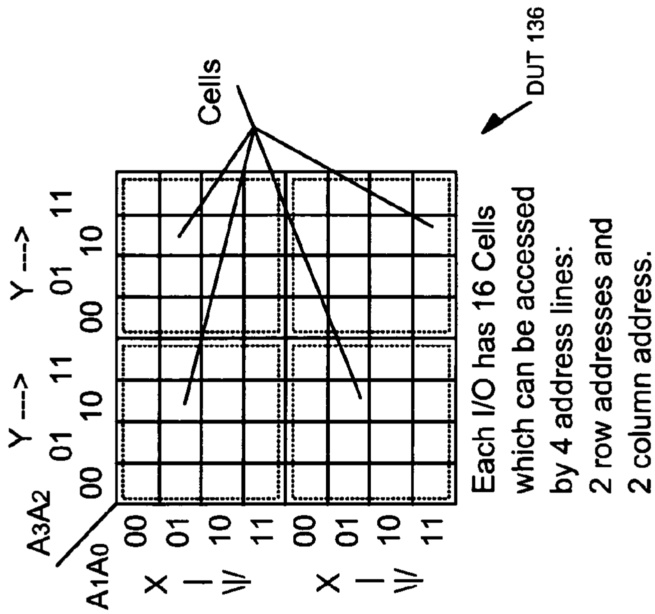
FIG. 6D illustrates still more details of the simplified memory device of FIG. 6A.

FIG. 6D still more details are filled in for the simplified memory device 136 of FIG. 6A. In this illustration, the individual cells are shown and it may be seen that the upper left-hand corner of each partition has a row address of 00, and a column address of 00. The two bits of the row address are asserted on address pins A0 and A1, while the two bits of the column address are asserted on address pins A2 and A3.

Figure 7A:
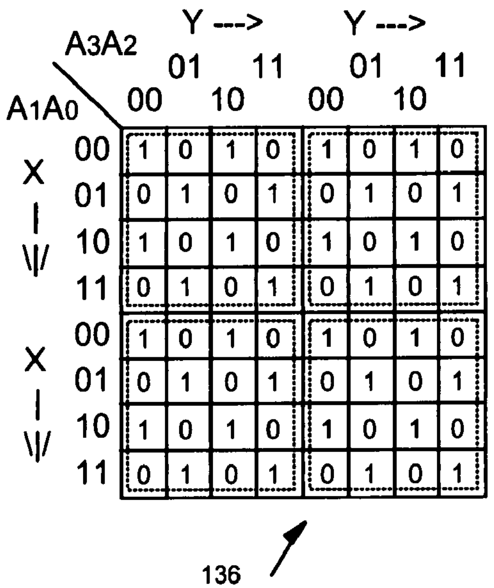
FIG. 7A illustrates, for the same simplified memory device, an example of a ripple X (increment row address fastest) address pattern and a checkerboard data pattern expressed in a conventional form and in pin vector form, according to an embodiment of the present invention.
Figure 7B:
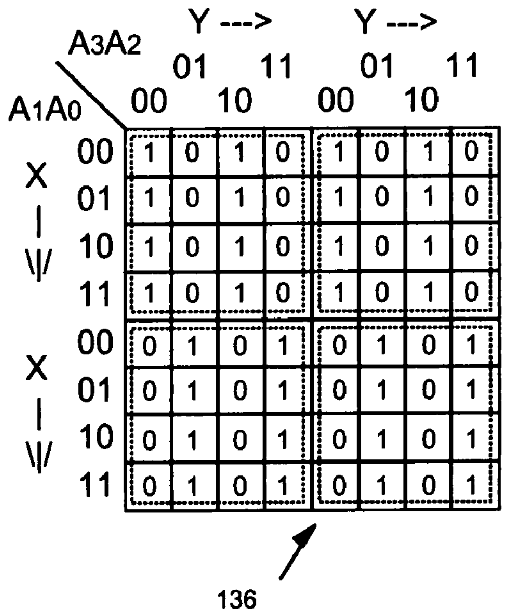
FIG. 7B illustrates, for the same simplified memory device, an example of a diagonal (increment both row and column address at the same time) address pattern and a complementary data pattern expressed in a conventional form and in pin vector form, according to an embodiment of the present invention.

In the example shown in FIG. 7B, a DUT 136 is shown filled with data according to a specified "diagonal" test pattern. That is, in the DUT 136 a pattern "1010 . . . " is shown that has been written diagonally in the I/O portions I/O 1 and I/O 2. The complement pattern, "0101 . . . "is shown written diagonally in the I/O 3 and I/O 4 portions of the DUT 136.

(Note that the 64-bit device in FIG. 7B has only a four bit data bus, so for each write cycle the four bits on the data bus D0D1D2D3 are concurrently written to the four respective portions I/O 1, I/O 2, etc. Thus the device 136 may be filled as shown in sixteen write cycles. By contrast, in the nominally four gigabits (actually 4,294,967,296 bits) RAM device shown in FIGS. 5A and 5B, sixteen bits are written at one time, with each of the sixteen bits being written concurrently to each of the sixteen portions of the device. Each of the 16 portions have 268,435,456 cells. Thus it takes 268,435,456 write cycles to fill the RAM.)

Immediately to the right of the device 136 in FIG. 7B, is shown a set 710B of addresses and data according to a first, conventional manner of organization, referred to herein as full-width test vectors. Each row in the collection of vectors 710B corresponds to one full-width test vector. Conventional test programs produce test vectors in the format of the illustrated test vectors 710B. The first such test vector 710B shown has address bits for each and every one of the four address pins and each and every one of the four data pins of the DUT 136. Hence, the name, "full-width."

According to the illustrated sequence of test vectors 710B, i.e., top row to bottom row, data is first written to a cell in the top row and left-hand column of each partition in DUT 136. This cell has an address A3A2A1A0=0000, as shown in the one of the full-width test vector 710B shown in the top row. Then data is next written to a cell in DUT 136 that is over one column to the right and down one row. This cell has an address A3A2A1A0=0101, as shown in the one of the full-width test vector 710B shown in the next row down.

In the right-hand portion of the first row of vectors 710B is shown the portion of the first full-width test vector 710B for the data pins of the DUT 136. As stated above, data is written in the sequence indicated by the set of test vectors 710B to all the memory locations in the device 136. That is, in a first write cycle the four data bits D3D2D1D0=0011 of the first full-width test vector 710B are written to the respective I/O portions of the device 136 for address A3A2A1A0= 0000. In a second write cycle the four bits D3D2D1D0=1100 of the second full-width test vector 710B are written for address A3A2A1A0=0101, and so on.

At the extreme right side of the FIG. 7B, portions 720B of address and data packets are shown. The packet portions 720B correspond to the test pattern defined by the set of full-width test vectors 710B shown above, but portions 720B are organized for sending to respective channel cards for respective pins of the DUT 136. That is, a first one of the portions 720B shown is a portion A0 set out in the top row, which consists of information exclusively for address pin A0 on the DUT 136. The packet portion A0 that is shown in FIG. 7B is simply the bits that are asserted on address pin A0 by a first channel card in successive write cycles. (It should be understood that what is shown in FIG. 7B is referred to as a portion A0 of a packet because according to an embodiment of the invention the assembled packet also includes other information not shown, as will be described further herein below.) The left-most bit in the row is for asserting on the A0 pin of the DUT 136 (via the pin's channel card) in a first write cycle, the next bit to the right is for asserting in a second write cycle, etc. Although the bits shown for packet portion A0 are for asserting in successive write cycles on the A0 pin, the packet for pin A0 is buffered on the channel card for pin A0 rather than being sent in the successive write cycles. That is, a first channel card, for pin A0, is sent all the information shown in the packet portion A0, a second channel card, for pin A1, is sent all the information shown in the packet portion A1, and so on.

FIG. 7A illustrates, in a fashion similar to FIG. 7B, a checkerboard data pattern with ripple X address pattern for the 64-bit device 136.

In addition to the information being organized into packets corresponding specifically to respective DUT 136 pins and their corresponding channel cards 450A (FIG. 4A) as illustrated in FIGS. 7A and 7B, the data for each channel card is compressed before sending it. This is done in order to reduce the volume of data that is necessary to transmit on the bus between the main frame 430 and channel cards 450A in the test head 440 (FIG. 4A). That is, after test data is generated in the computer 420 pin vectors are advantageously compiled for individual channel cards 450A and compressed in preprocessing block 406 before sending them to the main frame 430 in packets, storing them in the main frame data buffers 431 and 435 and then sending them, in turn, to the channel cards 450A. After receipt in a channel card 450A the data is decompressed by hardware assist decompressor 452.

The data compression includes detection of patterns and responsive encoding. For example, in a string of sixteen address or data bits "1001100001100111" a "flip" pattern may be detected, according to which the inverse ("flip") of the first eight bits, 10011000, are repeated for the next eight bits, 01100111. So instead of sending all sixteen bits only the first eight may be sent along with a code indicating to flip those eight bits for the next eight bits. Other patterns include i) shift, in which a first sequence of bits is shifted left or right by n bits to form a second pattern, ii) pad, in which a 1 or 0 is repeated n times, and iii) repeat, in which a first pattern is repeated n times.

As another example, the data for channel card A0 in FIG. 7B may be compressed by indicating that the repeat pattern applies, the pattern is "01," and n=8, i.e., the pattern is to be repeated eight times. Likewise, the data for channel card A3 may be compressed by indicating that the pad pattern applies in a first instance to "0" with n=8, and in a second instance to "1" with n=8.

In addition to compressing data as in the above examples, in which data is compressed with respect to sequences within a set of data for a single channel card, data may also be compressed with respect to sequences applying to numerous channel cards. For example, for the diagonal pattern shown in FIG. 7B note that the data is the same for data pins D0 and D1. (For data pins D2 and D3 the data is the complement of that for D0 and D1.) Specifically, the data for D0 and D1 is "1010 0101 1010 0101." This may be compressed into four vectors "D0: (((10, repeat), flip), repeat); D1: (((10, repeat), flip), repeat); D2: (((01, repeat), flip), repeat); D3: (((01, repeat), flip), repeat)." Further, since the same pattern applies to D0 and D1, this may be further compressed by sending it as a single vector for D0 and D1 addressed to more than one channel card concurrently, as "(encoded short address for multiple cards): (((10, repeat), flip), repeat)." Likewise, a single vector may be sent for D2 and D3 addressed to more than one channel card.

Figure 8:
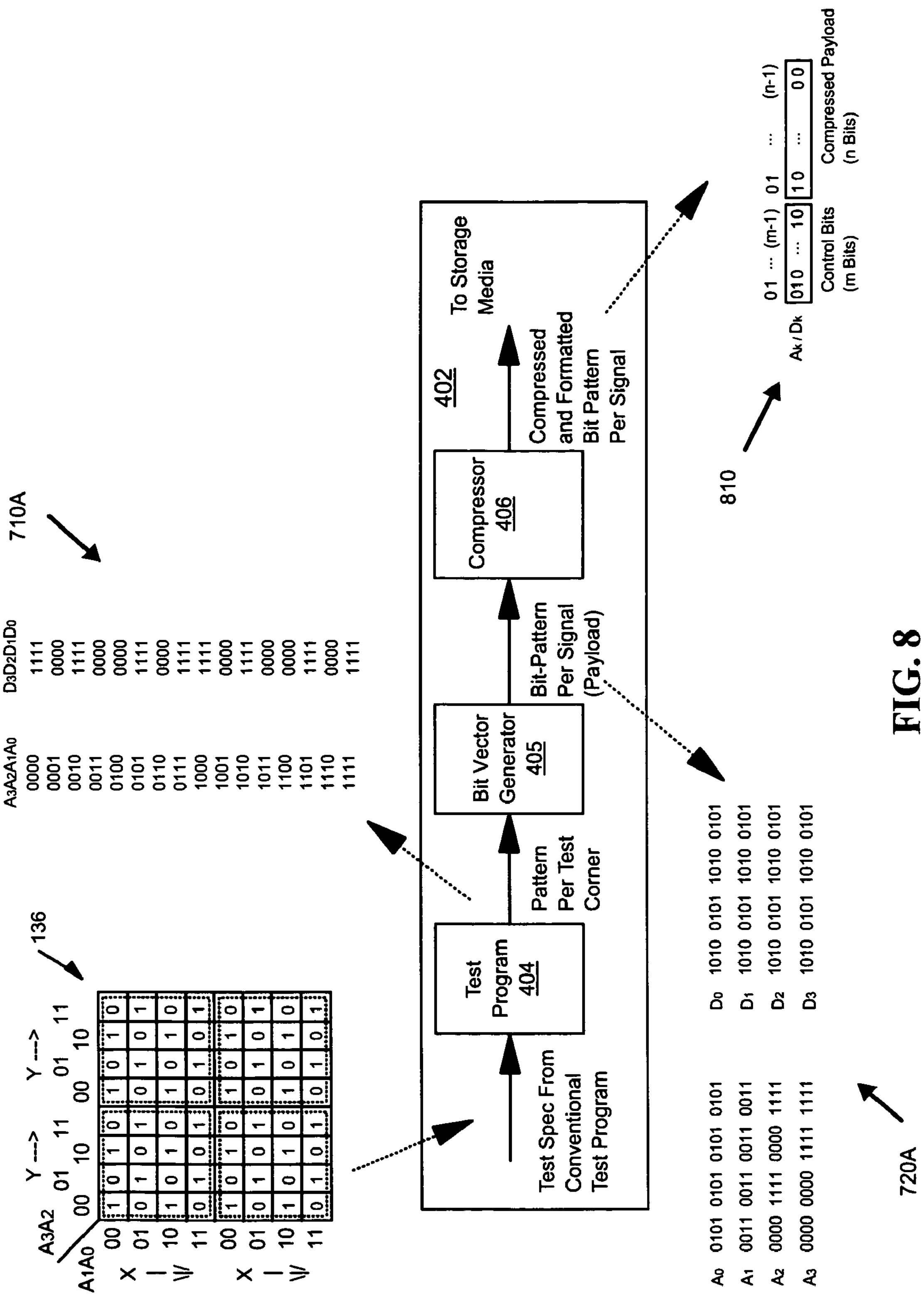
FIG. 8 illustrates aspects of preprocessing logic for producing test packets, according to an embodiment of the present invention.

Referring now to FIG. 8, aspects are illustrated for preprocessing module 402 of FIG. 4A that, according to an embodiment of the present invention, is implemented by means of a software program and generates the above described test packets. Module 402 in FIG. 8 has a test program 404 that receives a test specification. A simplified device under test 136 is shown in FIG. 8 with a checkerboard data pattern like that shown in FIG. 7A, illustrating an example of one such test specification. The test program 404 in FIG. 8 produces a full-width test vectors 710A having data and address bits as shown, which replicates functionality of a arithmetic logic unit in a conventional tester (but provides greater flexibility than a conventional ALU, as previously described). As previously described, the data and addresses produced by program 404 are organized by rows according to the sequence of memory addresses in DUT 136. That is, the first row is address bits "0000" and data bits "1111" for this address in each of the I/O partitions of device 136, the next row is address bits "0001" and data bits "0000" for this address, and so on.

Module 402 also has a bit vector (also known as pin vector) generator program 405 that receives the set of full-width test vectors 710A produced by program 404 and organizes them as pin vectors for the respective channel cards. That is, program 405 selects from the data and address bits of vectors 710A produced by program 404 a first sequence of bits as a first one of the pin vectors 720A, which has bits for no pins other than for address pin A0. Likewise, the program 405 selects a second a sequence of bits as a second one of the pin vectors 720A, which has bits for no pins other than for address pin A1. Likewise, the program 405 selects a third sequence of bits as a third one of the pin vectors 720A, which has bits for no pins other than for address pin A2. And the program 405 selects a fourth sequence of bits as a fourth one of the pin vectors 720A, which has bits for no pins other than for address pin A3. And the program selects a fifth sequence of bits as a fifth one of the pin vectors 720A, which has bits for no other pins other than for data pin D0. And the program selects a sixth sequence of bits as a sixth one of the pin vectors 720A, which has bits for no other pins other than for data pin D1. And so on, as shown in FIG. 8. The left-most bit in each sequence is the bit asserted in a first data transfer cycle for the channel card of the respective sequence. The next bit to the right in each sequence is the bit asserted in a second data transfer cycle for the channel card of the respective sequence, etc.

Module 402 of FIG. 8 also has a compressor program 406 that receives the data bit and address bit packet portions 720B, also referred to as the raw pin vector or "payload," produced by program 405 and compresses them in the manner described herein above into respective packets 810 in the format shown. In this format, each one of the packets 810 includes control bits in addition to the compressed payload. The control bits are for card addressing and decompressor directives.

In addition to sending packets 810 for individual channel cards (or for groups of channel cards, if compressing permits) and their corresponding DUT 136 pins, module 402 also sends DUT vectors (not shown) to the test head 440 (FIG. 4A). As previously described, each DUT vector has data that applies to all channel cards 450A (FIG. 4A), or at least a number of them, for specifying time duration and voltage levels for at least one test, and typically for a whole a sequence of tests. That is, a DUT vector specifies the timing and voltage level of the signals that are asserted each write cycle on DUT 136 pins responsive to pin vectors in the packets 810. Accordingly, each packet 810 also includes a pointer that points to one or more DUT vector that is applicable to the respective packet 810.

Figure 9:
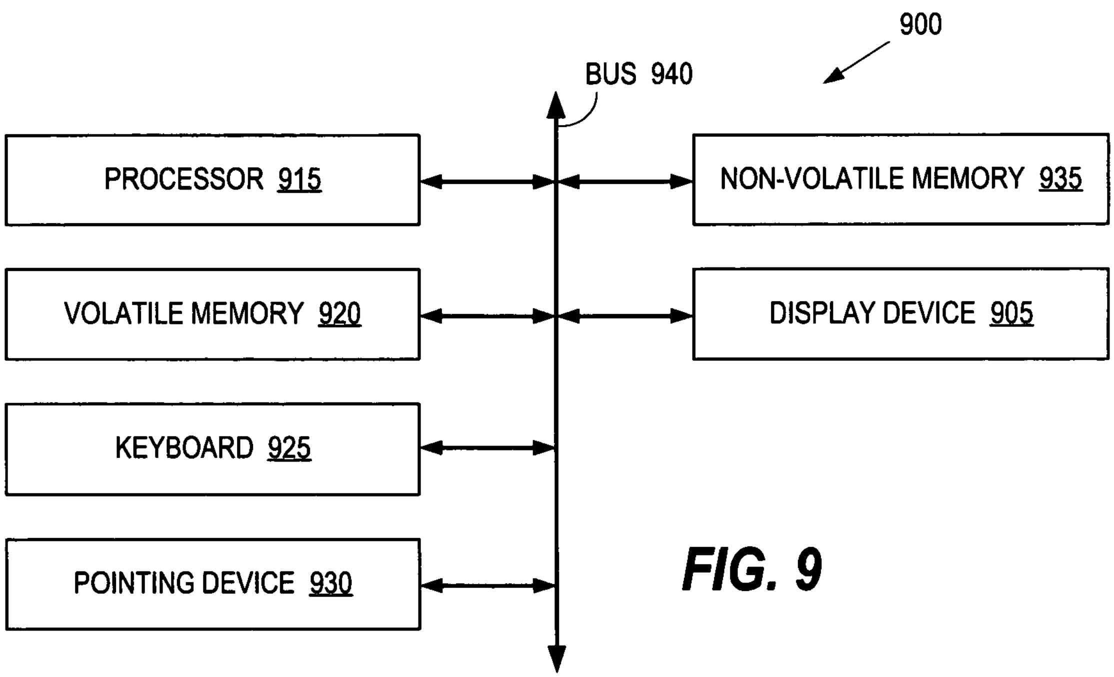
FIG. 9 illustrates a computer system applicable for inclusion in the test system, according to an embodiment of the present invention.

Referring now to FIG. 9, a block diagram illustrating a computer system 900 is shown, according to an embodiment of the present invention. The system 900 includes a processor 915, a volatile memory 920, e.g., RAM, a keyboard 925, a pointing device 930, e.g., a mouse, a nonvolatile memory 935, e.g., ROM, hard disk, floppy disk, CD-ROM, and DVD, and a display device 905 having a display screen. Memory 920 and 935 are for storing program instructions, which are executable by processor 915, to implement various embodiments of a method in accordance with the present invention. Components included in system 900 are interconnected by bus 940. A communications device (not shown) may also be connected to bus 940 to enable information exchange between system 900 and other devices.

In various embodiments system 900 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries.

It should be appreciated from the above that the invention involves a significant change in architecture to reduce problems associated with high speed testing. The invention includes novel features concerning the way data is delivered to the test head. More generally, VLSI tester of the present invention achieves improvements by trading higher hardware complexity, lower software complexity, lower speed and less data storage of a conventional tester for lower hardware complexity, higher software complexity, higher speed and more data storage.

Moving the sync clock to the optical domain, as in the system 400A of FIG. 4A, eliminates certain limitations concerning speed and timing precision. It should be appreciated that it is an advantage of the architecture of the invention that there are no operations in the main frame that have to be electrically clocked at a speed as high as the test frequency. Also, it is an advantage of the invention that local, lower-frequency, secondary clocks are produced by dividing down the high-frequency, global, master optical clock.

Another advantage of the architecture of the testing system disclosed concerns precision timing. A number of factors contribute to the precision timing achieved by the present invention. First, the use of optical fiber contributes to more precise timing because optical fibers are capable of transmitting very high frequency clock signals without any capacitive loading effect. Also, the choice of optical fiber pathways for the clock signals results in low jitter because the optical fibers inherently have high noise immunity.

More specifically, it should be understood from the foregoing that it is a feature of the disclosed embodiment of the invention that no high frequency electrical signals or clocks are transmitted a long distance, e.g., from the main frame to the test head. Although one or more high speed signals are sent from the main frame to the test head, optical means is used to do so. If any high frequency electrical clock is necessary anywhere, then it is created and used only locally, such as in the channel cards. This is advantageous because the optical domain is less prone to loading effects and high speed optical signals can be sent over longer distances without distortion. It would not be practically feasible to transmit an electrical signal from the main frame to approximately 100 cards in the test head, because such a signal will not survive the capacitive loading effect of the long electrical wire that is part of the data bus and the combined capacitive effect of the channel cards. An optical signal, on the other hand, does not have such a capacitive load problem. Thus, it should be understood that from this standpoint it really does not matter if the optical source is in the main frame or in the test head. The optical source is located in the main frame in the disclosed embodiment of the invention because there is typically more space in the main frame and this transmission distance is generally not a problem for an optical signal.

While this arrangement is advantageous, it should nevertheless be understood that it is not completely without its own issues. The optical signal must be split at the test head into slices for each channel card using optical splitters. This is problematic because the more an optical beam is split, the more the intensity of the beam drops. If the intensity drops below a certain threshold, optical to electrical converters are unable to convert the optical beam into an electrical signal. Furthermore, if the intensity of the optical beam is increased to deal with the problem of splitting the beam then the frequency of the optical source tends to drop. So the right balance has to be found for the trade off between the number of optical splitters, which sets an upper limit on number of channel cards, and the optical intensity, which limits the maximum frequency of the master clock). While the tradeoffs among intensity, frequency and number of splitters for optical transmission of high frequency signals do present limitations in the disclosed design, nevertheless, these limitations are not as severe as those in the electrical domain. These limitations can be significantly eased by having multiple optical sources for the reference/sync clocks and providing a calibration procedure for channel card delay adjustments.

As for synchronization, an optical source provides a better signal because optical fiber has very good immunity to external noise pickup and is unaffected by the above mentioned capacitive loading effects. Dividing signals as disclosed herein and having a good calibration method is generally sufficient to reduce skew to a manageable level, producing a better synchronous timing environment.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

The present invention also advantageously reduces the variety of hardware that is required for a tester. Another advantage of the present invention is its flexibility. The speed of the tester can be increased by factors such as replacing the optical oscillator, increasing the width of the data bus and increasing the amount of vector preprocessing and the amount of memory. The invention is particularly well suited for testing memory devices. Conventionally, preprocessing of test data as described herein has not been applied.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for testing an electrical device under test ("DUT") having address and data input pins coupled to respective channel cards in a test head for writing data to memory cells of the DUT, wherein specified tests define test patterns and for such a pattern test vectors define data for associated sets of address bits, the method comprising the steps of:

generating pin vectors for respective ones of the channel cards and DUT pins by a pin vector generator process of a computer system program, wherein generating such a pin vector includes selecting, from the test vectors, bits for the pin vector's respective one of the address or data pins such that the pin vector has a sequence of bits for driving its DUT pin to a sequence of states;

generating DUT vectors for specifying timing and voltage for the tests, wherein ones of the DUT vectors apply to numerous ones of the DUT pins and numerous ones of the tests;

compressing the pin vectors;

forming packets, wherein such a packet contains one of the compressed pin vectors, an address for the pin vector's associated channel card and a pointer to one or more of the DUT vectors; and sending the packets and the DUT vectors to the respective channel cards via a pipeline, wherein the pipeline includes a data bus from a main frame to the test head and the sending of the pin vectors includes:

transmitting the packets over the data bus, wherein the data bus is numerous bits wide and bits of such a packet are transmitted in parallel on numerous bits of the data bus; and controlling timing of the transmitting by optical control signals transmitted from the main frame to the test head over an optical control bus, wherein the optical control signals include a high frequency reference clock.

2. The method of claim 1, comprising the steps of:

operating the pipeline in data transfer cycles at an operating frequency, including the step of delivering W bits per pipeline data transfer cycle; and decompressing the packets by decompressors of the respective channel cards, wherein the decompressing includes the step of operating such a decompressor in decompressor read cycles, wherein the decompressor reads X bits per decompressor read cycle, W being greater than X, so that the pipeline may perform the data transfer cycles less frequently than the decompressor performs the decompressor read cycles.

3. The method of claim 2, wherein the step of decompressing includes the step of:

operating such a decompressor in decompressor output cycles, including outputting Y bits per decompressor output cycle, wherein Y is greater than X, so that the decompressor may perform the decompressor read cycles less frequently than the decompressor output cycles.

4. The method of claim 3 comprising the step of:

processing the decompressed pin vectors through buffers of the respective channel cards, including the steps of:

operating the buffers in buffer read cycles, wherein such a buffer reads Y bits per buffer read cycle; and operating such a buffer in buffer output cycles, including outputting Z bits per buffer output cycle, so that the buffer may perform the buffer read cycles less frequently than the buffer output cycles.

5. The method of claim 1, wherein the data bus includes an optical path.

6. The method of claim 4 comprising the steps of:

converting the high speed optical control signals by a converter into electrical signals; and dividing the electrical signals by dividers to produce secondary electrical clocks at the channel cards.

7. The method of claim 1 comprising the step of:

saving a set of the compressed pin vectors in storage before testing of the DUT begins, wherein the set includes sufficient data to fill all the memory cells of the DUT so that there is no need to generate or send additional pin vectors during the test of the DUT.

8. The method of claim 1 comprising the step of:

receiving test data from the DUT by a decompressor process of the computer system program, wherein the test data includes pin vectors.

9. The method of claim 1 wherein the compressing of the pin vectors includes compressing by a compressor process of the computer system program.

10. A computer readable medium having stored thereon a set of instructions including instructions that, when executed by a computer, performs a process for testing an electrical device under test ("DUT") having address and data input pins coupled to respective channel cards in a test head for writing data to memory cells of the DUT, wherein specified tests define test patterns and for such a pattern test vectors define data for associated sets of address bits, the computer program product comprising:

instructions for generating pin vectors for respective ones of the channel cards and DUT pins by a pin vector generator process of a computer system program, wherein generating such a pin vector includes selecting, from the test vectors, bits for the pin vector's respective one of the address or data pins such that the pin vector has a sequence of bits for driving its DUT pin to a sequence of states;

instructions for generating DUT vectors for specifying timing and voltage for the tests, wherein ones of the DUT vectors apply to numerous ones of the DUT pins and numerous ones of the tests;

instructions for compressing the pin vectors;

instructions for forming packets, wherein such a packet contains one of the compressed pin vectors, an address for the pin vector's associated channel card and a pointer to one or more of the DUT vectors; and instructions for sending the packets and the DUT vectors to the respective channel cards via a pipeline, wherein the pipeline includes a data bus from a main frame to the test head and the sending of the pin vectors includes:

transmitting the pin vectors over the data bus, wherein the data bus is numerous bits wide and bits of such a packet are transmitted in parallel on numerous bits of the data bus; and controlling timing of the transmitting by optical control signals transmitted from the main frame to the test head over an optical control bus, wherein the optical control signals include a high frequency reference clock.

11. The computer readable medium of claim 10, comprising:

instructions for operating the pipeline in data transfer cycles at an operating frequency, wherein W bits are delivered per pipeline data transfer cycle; and instructions for decompressing the packets at the respective channel cards, including instructions for reading the packets in decompressor read cycles of X bits per cycle, W being greater than X, so that the pipeline may perform the data transfer cycles less frequently than the decompressor performs the decompressor read cycles.

12. The computer readable medium of claim 11, wherein the instructions for decompressing include:

instructions for outputting the decompressed packets in decompressor output cycles of Y bits per cycle, wherein Y is greater than X, so that the decompressor may perform the decompressor read cycles less frequently than the decompressor output cycles.

13. The computer readable medium of claim 12, comprising:

instructions for processing the decompressed pin vectors through buffers of the respective channel cards, including:

instructions for operating the buffers in buffer read cycles, wherein such a buffer reads Y bits per buffer read cycle; and instructions for operating such a buffer in buffer output cycles, including outputting Z bits per buffer output cycle, so that the buffer may perform the buffer read cycles less frequently than the buffer output cycles.

14. The computer readable medium of claim 10, wherein the data bus includes an optical path.

15. The computer readable medium of claim 13, comprising:

instructions for dividing electrical signals by dividers to produce secondary electrical clocks at the channel cards.

16. The computer readable medium of claim 10, comprising:

instructions for saving a set of the compressed pin vectors in storage before testing of the DUT begins, wherein the set includes sufficient data to fill all the memory cells of the DUT so that there is no need to generate or send additional pin vectors during the test of the DUT.

17. The computer readable medium of claim 10, comprising:

instructions for receiving test data from the DUT a decompressor process of the computer system program, wherein the test data includes pin vectors.

18. The computer readable medium of claim 10, comprising:

instructions for loading additional ones of the pin vectors into the pipeline as testing progresses.

19. An apparatus for testing an electrical device under test ("DUT") having address and data input pins coupled to respective channel cards in a test head for writing data to memory cells of the DUT, wherein specified tests define test patterns and for such a pattern test vectors define data for associated sets of address bits, the apparatus comprising a computer system operable with one or more software processes to perform the steps of:

generating pin vectors for respective ones of the channel cards and DUT pins by a pin vector generator process of a computer system program, wherein generating such a pin vector includes selecting, from the test vectors, bits for the pin vector's respective one of the address or data pins such that the pin vector has a sequence of bits for driving its DUT pin to a sequence of states;

generating DUT vectors for specifying timing and voltage for the tests, wherein ones of the DUT vectors apply to numerous ones of the DUT pins and numerous ones of the tests;

compressing the pin vectors;

forming packets, wherein such a packet contains one of the compressed pin vectors, an address for the pin vector's associated channel card and a pointer to one or more of the DUT vectors; and sending the packets and the DUT vectors to the respective channel cards via a pipeline, wherein the pipeline includes a data bus from a main frame to the test head and the sending of the pin vectors includes:

transmitting the pin vectors over the data bus, wherein the data bus is numerous bits wide and bits of such a packet are transmitted in parallel on numerous bits of the data bus; and controlling timing of the transmitting by optical control signals transmitted from the main frame to the test head over an optical control bus, wherein the optical control signals include a high frequency reference clock.

20. The apparatus of claim 19 wherein the computer system is operable so that the one or more software processes perform the steps of:

operating the pipeline in data transfer cycles at an operating frequency, including the step of delivering W bits per pipeline data transfer cycle; and decompressing the packets by decompressors of the respective channel cards, wherein the decompressing includes the step of operating such a decompressor in decompressor read cycles, wherein the decompressor reads X bits per decompressor read cycle, W being greater than X, so that the pipeline may perform the data transfer cycles less frequently than the decompressor performs the decompressor read cycles.

21. The apparatus of claim 20, wherein the computer system is operable so that step of decompressing performed by the one or more software processes includes the step of:

operating such a decompressor in decompressor output cycles, including outputting Y bits per decompressor output cycle, wherein Y is greater than X, so that the decompressor may perform the decompressor read cycles less frequently than the decompressor output cycles.

22. The apparatus of claim 21 wherein the computer system is operable so that the one or more software processes perform the step of:

processing the decompressed pin vectors through buffers of the respective channel cards, including the steps of:

operating the buffers in buffer read cycles, wherein such a buffer reads Y bits per buffer read cycle; and operating such a buffer in buffer output cycles, including outputting Z bits per buffer output cycle, so that the buffer may perform the buffer read cycles less frequently than the buffer output cycles.

23. The apparatus of claim 22, wherein the data bus includes an optical path.

24. The apparatus of claim 22 wherein the computer system is operable so that the one or more software processes perform the steps of:

converting the high speed optical control signals by a converter into electrical signals; and dividing the electrical signals by dividers to produce secondary electrical clocks at the channel cards.

25. The apparatus of claim 19 wherein the computer system is operable so that the one or more software processes perform the step of:

saving a set of the compressed pin vectors in storage before testing of the DUT begins, wherein the set includes sufficient data to fill all the memory cells of the DUT so that there is no need to generate or send additional pin vectors during the test of the DUT.

26. The apparatus of claim 19 wherein the computer system is operable so that the one or more software processes perform the step of:

receiving test data from the DUT by a decompressor process of the computer system program, wherein the test data includes pin vectors.

* * * * *